United States Patent
Nishiguchi et al.

(10) Patent No.: US 10,273,366 B2
(45) Date of Patent: Apr. 30, 2019

(54) ANTICORROSIVE COATING COMPOSITION, ANTICORROSIVE COATING FILM, AND METHOD FOR PREVENTING CORROSION OF SUBSTRATE

(71) Applicant: CHUGOKU MARINE PAINTS, LTD., Otake-shi (JP)

(72) Inventors: Takahiro Nishiguchi, Otake (JP); Tomohisa Sumida, Otake (JP); Shingo Wakisaka, Otake (JP)

(73) Assignee: CHUGOKU MARINE PAINTS, LTD., Otake-shi (JP)

( * ) Notice: Subject to any disclaimer, the term of this patent is extended or adjusted under 35 U.S.C. 154(b) by 165 days.

(21) Appl. No.: 14/912,538

(22) PCT Filed: Aug. 21, 2014

(86) PCT No.: PCT/JP2014/071876
§ 371 (c)(1),
(2) Date: Feb. 17, 2016

(87) PCT Pub. No.: WO2015/025918
PCT Pub. Date: Feb. 26, 2015

(65) Prior Publication Data
US 2016/0200916 A1    Jul. 14, 2016

(30) Foreign Application Priority Data
Aug. 23, 2013  (JP) .................................. 2013-173716

(51) Int. Cl.
*C09D 5/08* (2006.01)
*C09D 163/00* (2006.01)

(52) U.S. Cl.
CPC ............. *C09D 5/08* (2013.01); *C09D 163/00* (2013.01)

(58) Field of Classification Search
None
See application file for complete search history.

(56) References Cited

U.S. PATENT DOCUMENTS

| 4,812,513 | A | | 3/1989 | Hirose | |
| 4,877,838 | A | * | 10/1989 | Toman | ................. C09D 133/04 524/512 |

(Continued)

FOREIGN PATENT DOCUMENTS

| CN | 103254732 A | 8/2013 |
| EP | 1 947 154 A1 | 7/2008 |

(Continued)

OTHER PUBLICATIONS

Office Action dated Aug. 23, 2016 in Japanese Patent Application No. 2015-532895.

(Continued)

*Primary Examiner* — Joseph D Anthony
(74) *Attorney, Agent, or Firm* — Oblon, McClelland, Maier & Neustadt, L.L.P.

(57) ABSTRACT

An anticorrosive coating composition is provided which is excellent in adhesion to a substrate and in anticorrosiveness, and which provides a coating film whose surfaces hardly have bubbles remaining thereon even when the coating composition is applied by using a brush or a roller. The anticorrosive coating composition includes an epoxy resin (a), a curing agent (b) and a poly-α-olefin (c) that includes a structural unit derived from an α-olefin having 6 or more carbon atoms.

14 Claims, 1 Drawing Sheet

(56) References Cited

U.S. PATENT DOCUMENTS

| | | | |
|---|---|---|---|
| 5,196,485 A | 3/1993 | McMonigal et al. | |
| 9,790,397 B2 * | 10/2017 | Wakisaka | C08G 59/54 |
| 2002/0091197 A1 * | 7/2002 | Nakamura | C08F 220/18 |
| | | | 525/123 |
| 2006/0020067 A1 * | 1/2006 | Brant | C09J 123/10 |
| | | | 524/236 |
| 2007/0021566 A1 * | 1/2007 | Tse | C09D 123/10 |
| | | | 525/240 |
| 2007/0036982 A1 * | 2/2007 | Perez | B05D 7/14 |
| | | | 428/416 |
| 2008/0000383 A1 | 1/2008 | Nagai et al. | |
| 2008/0081878 A1 * | 4/2008 | Jiang | C08F 10/06 |
| | | | 525/191 |
| 2008/0102283 A1 | 5/2008 | Momiyama et al. | |
| 2010/0004355 A1 | 1/2010 | Sumida | |
| 2015/0361271 A1 | 12/2015 | Kato et al. | |
| 2015/0368505 A1 | 12/2015 | Wakisaka et al. | |

FOREIGN PATENT DOCUMENTS

| | | |
|---|---|---|
| JP | 1-141960 A | 6/1989 |
| JP | 6-145559 A | 5/1994 |
| JP | 6-504314 A | 5/1994 |
| JP | 10-101773 A | 4/1998 |
| JP | 2000-129168 A | 5/2000 |
| JP | 2006-342360 A | 12/2006 |
| JP | 2007-314762 A | 12/2007 |
| JP | 2008-179803 A | 8/2008 |
| JP | 4451390 B2 | 4/2010 |
| KR | 10-1999-0045735 A | 6/1999 |
| KR | 10-2007-0086320 A | 8/2007 |
| WO | WO 87/07900 A1 | 12/1987 |
| WO | WO 2005/000979 A1 | 1/2005 |
| WO | WO 2007/046301 A1 | 4/2007 |
| WO | WO 2012/153382 A1 | 11/2012 |
| WO | WO 2014/136752 A1 | 9/2014 |
| WO | WO 2014/136753 A1 | 9/2014 |

OTHER PUBLICATIONS

International Search Report dated Nov. 25, 2014 in PCT/JP2014/071876.
Combined Chinese Office Action and Search Report dated Dec. 2, 2016 in Patent Application No. 201480046401.9 (with English translation of categories of cited documents).
"Jiaonianji Shengchan Yuanli Yu Jishu", http://www.cip.com.cn, 2009, 7 Pages.
Combined Chinese Office Action and Search Report dated Aug. 14, 2017 in Patent Application No. 201480046401.9 (with English translation of Categories of Cited Documents).
"Curing of Epoxy Resin" Adhesives and Coatings, 2012, 4 Pages.
Office Action dated Jan. 19, 2018 in Korean Patent Application No. 10-2016-7004514.
Extended European Search Report dated Mar. 13, 2017 in European Patent Application No. 14837593.4.

* cited by examiner

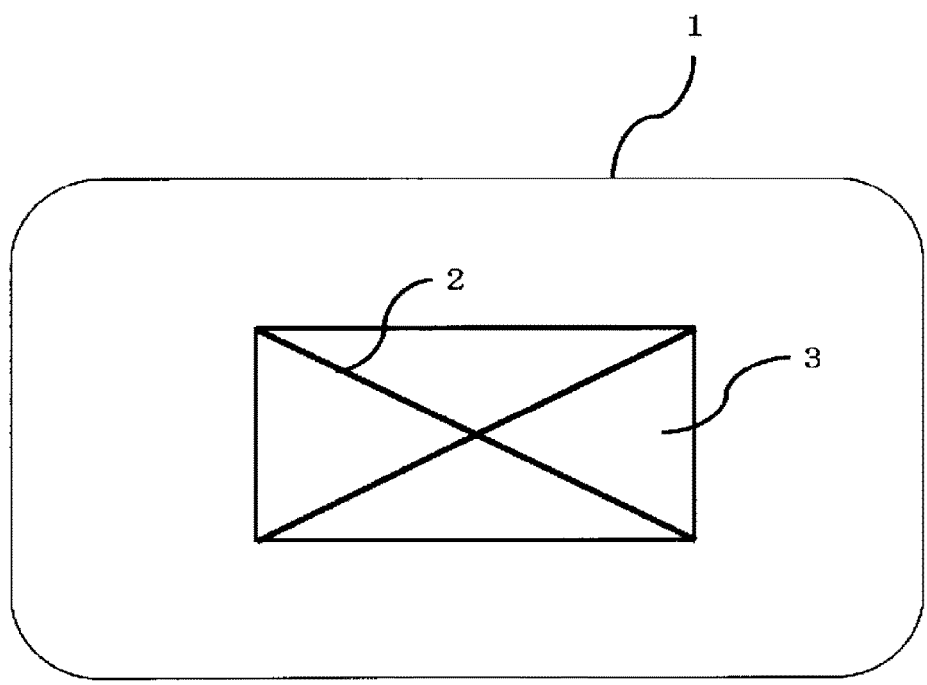

ANTICORROSIVE COATING COMPOSITION, ANTICORROSIVE COATING FILM, AND METHOD FOR PREVENTING CORROSION OF SUBSTRATE

TECHNICAL FIELD

The present invention relates to an anticorrosive coating composition, an anticorrosive coating film, and a method for preventing corrosion of a substrate. More particularly, the invention relates to an anticorrosive coating composition capable of forming an anticorrosive coating film excellent in adhesion to metal substrates, anticorrosive properties, and the like, an anticorrosive coating film formed from the composition, and a method for preventing corrosion of metal substrates using the composition.

BACKGROUND ART

Usually, for prevention of corrosion, large-sized steel structures such as ships, land structures, and bridges are subjected to anticorrosive coating using an anticorrosive coating composition. In the anticorrosive coating, an anticorrosive coating composition is applied on a surface of a steel plate or the like to form an anticorrosive coating film having a thickness of several hundred to several thousand micrometers. This allows the surface of the steel plate or the like to be covered with the anticorrosive coating film to prevent the steel plate or the like from contacting with oxygen, salt, vapor, and the like, thereby preventing the corrosion of the steel plate or the like.

Meanwhile, on welding lines or edges, where film thickness is difficult to ensure, stripe coating is performed by using a brush or a roller. Coating using a brush or a roller, as compared with spray coating, lets bubbles remain on the surfaces of the coating film, consequently impairing the appearance of the coating film. Thus, a defoaming agent is generally added to a coating material.

Known examples of the defoaming agent include silicone-based defoaming agents and acrylic/vinyl ether-based defoaming agents.

As the coating composition, Applicant of the present invention has disclosed an anticorrosive coating composition containing a non-tar-based epoxy resin, a curing agent, an epoxy group-containing alkoxysilane compound, a specific flaky pigment and an extender pigment (Patent Literature 1).

Patent Literature 2 discloses an epoxy resin coating composition containing a silicone-based defoaming agent; Patent Literature 3 discloses an epoxy resin coating composition containing an acrylic/vinyl ether-based defoaming agent; and Patent Literature 4 discloses an epoxy coating composition containing polyolefin wax.

CITATION LIST

Patent Literature

[Patent Literature 1] JP-A-2000-129168
[Patent Literature 2] JP-A-H10-101773
[Patent Literature 3] JP-B-4451390
[Patent Literature 4] JP-A-H6-145559

SUMMARY OF INVENTION

Technical Problem

Structures such as ballast tanks of ships are also required to have anticorrosiveness, and thus undergo anticorrosive coating. For such structures, epoxy-based anticorrosive coating compositions are generally used, and for welding lines and edges, where film thickness is difficult to ensure, stripe coating is performed by extra coating using a brush or a roller; at this time, it is important that there is less bubble entrapping in consideration of anticorrosiveness and appearance.

Yet, silicone-based defoaming agents conventionally known tend to reduce the adhesion of a film to be formed thereon. Further, acrylic/vinyl ether-based defoaming agents are weak in their effect, their addition in a small amount failing to provide adequate effect in some cases. Their effect tends to be weak particularly in epoxy resin-based coating materials with a liquid acrylic polymer added thereto for modifying interlayer adhesion.

Technical Solution

The present inventors, as a result of their extensive studies, have found that adding a poly-α-olefin that comprises a structural unit derived from an α-olefin having 6 or more carbon atoms to an epoxy-based anticorrosive coating composition allows the anticorrosive coating composition to exhibit good defoaming effect and is capable of forming coating films excellent in anticorrosiveness.

Configurations of the present invention are as follows:

[1] An anticorrosive coating composition comprising an epoxy resin (a), a curing agent (b) and a poly-α-olefin (c) that comprises a structural unit derived from an α-olefin having 6 or more carbon atoms.

[2] The anticorrosive coating composition described in the [1], comprising the poly-α-olefin (c) in an amount of from 0.01 to 5 parts by weight (nonvolatile content) with respect to 100 parts by weight of a nonvolatile content in the anticorrosive coating composition.

[3] The anticorrosive coating composition described in the [1] or [2], further comprising a silane coupling agent (d).

[4] The anticorrosive coating composition described in any one of the [1] to [3], further comprising an amide wax (e) and a liquid acrylic polymer (f).

[5] The anticorrosive coating composition described in the [4], wherein the liquid acrylic polymer (f) comprises a structural unit derived from an acrylate having an alkyl group of 4 to 18 carbon atoms containing a branched structure.

[6] The anticorrosive coating composition described in the [4] or [5], wherein the liquid acrylic polymer (f) comprises a structural unit derived from isobutyl acrylate or 2-ethylhexyl acrylate.

[7] The anticorrosive coating composition described in any one of the [4] to [6], wherein the composition comprises the liquid acrylic polymer (f) in an amount of from 0.01 to 5 parts by weight (nonvolatile content) with respect to 100 parts by weight of a nonvolatile content in the anticorrosive coating composition.

[8] The anticorrosive coating composition described in any one of the [4] to [7], wherein the liquid acrylic polymer (f) has a glass transition temperature of 0° C. or less.

[9] The anticorrosive coating composition described in any one of the [1] to [8], further comprising an extender pigment (g).

[10] The anticorrosive coating composition described in the [9], wherein the extender pigment (g) includes at least a flaky pigment (h).

[11] An anticorrosive coating film formed from the anticorrosive coating composition described in any one of the [1] to [10].

[12] A method for preventing corrosion of a substrate, comprising a step of applying on a substrate the anticorrosive coating composition described in any one of the [1] to [10].

[13] A two-component paint which is composed of a combination of a main agent component and a curing agent component that are stored so as not to contact each other, wherein the main agent component includes an epoxy resin (a);

the curing agent component includes a curing agent (b); and at least one of the main agent component and the curing agent component includes a poly-α-olefin (c) that comprises a structural unit derived from an α-olefin having 6 or more carbon atoms.

[14] A multi-component paint which is composed of a combination of a main agent component, a curing agent component and at least one other component that are stored so as not to contact each other, wherein the main agent component includes an epoxy resin (a);

the curing agent component includes a curing agent (b); and at least one of the main agent component, the curing agent component and the at least one other component includes a poly-α-olefin (c) that comprises a structural unit derived from an α-olefin having 6 or more carbon atoms.

[15] A main agent component for use in producing the anticorrosive coating composition described in the [1] by being mixed with a curing agent component including a curing agent (b), wherein the main agent component comprises an epoxy resin (a) and a poly-α-olefin (c) that comprises a structural unit derived from an α-olefin having 6 or more carbon atoms.

[16] A curing agent component for use in producing the anticorrosive coating composition described in the [1] by being mixed with a main agent component including an epoxy resin (a), wherein the curing agent component comprises a curing agent (b) and a poly-α-olefin (c) that comprises a structural unit derived from an α-olefin having 6 or more carbon atoms.

Advantageous Effects of Invention

According to the present invention, an anticorrosive coating composition can be provided which is excellent in adhesion to a substrate and in anticorrosiveness, and which provides a coating film whose surfaces hardly have bubbles remaining thereon even when the coating composition is applied by using a brush or a roller.

BRIEF DESCRIPTION OF DRAWING

FIG. 1 is a schematic view for explaining an adhesion test in Examples.

DESCRIPTION OF EMBODIMENTS

«Anticorrosive Coating Composition»

An anticorrosive coating composition of the present invention (hereinafter also referred to simply as the "composition of the present invention") comprises an epoxy resin (a), a curing agent (b) and a poly-α-olefin (c) that comprises a structural unit derived from an α-olefin having 6 or more carbon atoms.

Since the composition of the present invention comprises these (a) to (c), it is an anticorrosive coating composition excellent in adhesion to a substrate and in anticorrosive properties, and even when the composition is applied with a brush or a roller, bubbles can be inhibited from occurring on the surface of the coating film.

Therefore, the composition of the present invention is suitable in ship structures such as a ballast tank as an anticorrosive coating composition to be applied with a brush or a roller.

From viewpoints such as preservation stability, the composition of the present invention is preferably a two-component composition to be prepared by mixing a main agent component and a curing agent component (namely, composition to be prepared by mixing individual components of a two-component paint which is composed of a combination of a main agent component and a curing agent component that are stored so as not to contact each other, wherein the main agent component includes the epoxy resin (a); the curing agent component includes the curing agent (b); and at least one of the main agent component and the curing agent component includes the poly-α-olefin (c) that comprises a structural unit derived from an α-olefin having 6 or more carbon atoms). The composition of the present invention may be of one-component type depending on the selection of the curing agent.

The composition of the present invention may be of multi-component (namely, composition to be prepared by mixing individual components of a multi-component paint which is composed of a combination of a main agent component, a curing agent component and at least one other component, wherein the main agent component includes the epoxy resin (a); the curing agent component includes the curing agent (b); and at least one of the main agent component, the curing agent component and the at least one other component includes the poly-α-olefin (c) that comprises a structural unit derived from an α-olefin having 6 or more carbon atoms). As components to be contained in said other component, there can be mentioned those contributing to improving the coatability exhibited by the composition and properties of the coating film formed from the composition. For example, there can be mentioned poly-α-olefins (c) that comprises a structural unit derived from an α-olefin having 6 or more carbon atoms, silane coupling agents (d), amide waxes (e), liquid acrylic polymers (f), extender pigments (g), coloring pigments, anti-sagging and anti-settling agents, solvents, plasticizers, curing accelerators, inorganic dehydrating agents (stabilizers), antifouling agents, and/or the like. That is, such components are not particularly limited as long as being other than the epoxy resin (a) contained in the main agent component and the curing agent (b) contained in the curing agent component.

<Epoxy Resin (a)>

The epoxy resin (a) is not particularly limited, and examples of the epoxy resin (a) include non-tar-based epoxy resins described in JP-A-H11-343454 and JP-A-H10-259351.

Examples of the epoxy resin (a) include polymers or oligomers containing two or more epoxy groups in molecules thereof and polymers or oligomers produced by ring-opening reactions of the epoxy groups. Examples of such epoxy resins include bisphenol-type epoxy resins, glycidyl ester-type epoxy resins, glycidyl amine-type epoxy resins, phenol novolac-type epoxy resins, cresol-type epoxy resins, dimer acid-modified epoxy resins, aliphatic epoxy resins, alicyclic epoxy resins, and epoxidized oil-based epoxy resins.

Specific examples of such epoxy resins (a) include bisphenol A-type epoxy resins (bisphenol A diglycidyl ether type); bisphenol AD-type epoxy resins; bisphenol F-type epoxy resins obtained from epichlorohydrin and bisphenol F (4,4'-methylene bisphenol); epoxy novolac resins; alicyclic epoxy resins obtained from 3,4-epoxyphenoxy-3',4'-epoxyphenyl carboxy methane and the like; brominated epoxy resins in which at least one of hydrogen atoms bonded to a benzene ring in a bisphenol A-type epoxy resin is substituted with a bromine atom; aliphatic epoxy resins obtained from epichlorohydrin and aliphatic dihydric alcohol; and multifunctional epoxy resins obtained from epichlorohydrin and tri(hydroxyphenyl)methane.

Among them, from viewpoints such as that there can be obtained an anticorrosive coating film having excellent adhesion to a substrate, preferred are bisphenol-type epoxy resins, more preferred are bisphenol A-type and bisphenol F-type epoxy resins, and particularly preferred are bisphenol A-type epoxy resins.

Examples of bisphenol A-type epoxy resins that are particularly preferably used include polycondensates of bisphenol A-type diglycidyl ethers, such as bisphenol A diglycidyl ether, bisphenol A polypropylene oxide diglycidyl ether, bisphenol A ethylene oxide diglycidyl ether, hydrogenated bisphenol A diglycidyl ether, and hydrogenated bisphenol A propylene oxide diglycidyl ether.

The epoxy resin (a) may be obtained by synthesizing using a conventionally known method or may be a commercially available product.

Examples of commercially available products that are liquid under room temperature include "E028" (a bisphenol A diglycidyl ether resin manufactured by Ohtake-Meishin Chemical Co., Ltd., epoxy equivalent: from 180 to 190, viscosity: from 12,000 to 15,000 mPa·s/25° C.), "jER-807" (a bisphenol F diglycidyl ether resin manufactured by Mitsubishi Chemical Corporation, epoxy equivalent: from 160 to 175, viscosity: from 3,000 to 4,500 mPa·s/25° C.), "FLEP 60" (manufactured by Toray Fine Chemicals Co., Ltd., epoxy equivalent: about 280, viscosity: about 17,000 mPa·s/25° C.), "E-028-90X" (a xylene solution of a bisphenol A diglycidyl ether resin (an 828 type epoxy resin solution) manufactured by Ohtake-Meishin Chemical Co., Ltd., epoxy equivalent: about 210).

Examples thereof that are semi-solid under room temperature include "jER-834" (a bisphenol A-type epoxy resin manufactured by Mitsubishi Chemical Corporation, epoxy equivalent: from 230 to 270), and "E-834-85X" (a xylene solution of a bisphenol A-type epoxy resin (a 834 type epoxy resin solution) manufactured by Ohtake-Meishin Chemical Co., Ltd., epoxy equivalent: about 300).

Examples thereof that are solid under room temperature include "jER 1001" (a bisphenol A-type epoxy resin manufactured by Mitsubishi Chemical Corporation, epoxy equivalent: from 450 to 500) and "E-001-75" (a xylene solution of a bisphenol A-type epoxy resin (a 1001 type epoxy resin solution) manufactured by Ohtake-Meishin Chemical Co., Ltd., epoxy equivalent: about 630). The epoxy resin (a) may be used as one kind alone or in combination of two or more kinds.

The epoxy resin (a) is preferably liquid or semi-solid under room temperature (a temperature of from 15 to 25° C.; hereinafter the same shall apply), from viewpoints such as that there can be obtained a composition having excellent adhesion to a substrate.

The epoxy resin (a) has an epoxy equivalent of preferably from 150 to 1000, more preferably from 150 to 600, and particularly preferably from 180 to 500, from viewpoints such as anticorrosive properties. The epoxy equivalent is calculated in accordance with method defined in JIS K-7236.

A weight-average molecular weight of the epoxy resin (a) measured by GPC (gel permeation chromatograph) is preferably from 350 to 20,000, although the weight-average molecular weight thereof varies depending on coating and curing conditions for the composition to be obtained (examples: ordinary temperature drying coating or baking coating) and the like and thus it is not determined unconditionally.

The composition of the present invention includes the epoxy resin (a) in an amount of preferably from 5 to 40% by weight and more preferably from 10 to 30% by weight.

When the composition of the present invention is a two-component composition comprising a main agent component and a curing agent component (namely, composition to be prepared by mixing individual components of the two-component paint) or a multi-component composition (namely, composition to be prepared by mixing individual components of the multi-component paint), the epoxy resin (a) is contained in the main agent component and is desirably contained therein in an amount of preferably from 5 to 80% by weight, and more preferably from 5 to 50% by weight.

<Curing Agent (b)>

The curing agent (b) is not particularly limited and examples of the curing agent (b) include amine-based curing agents and carboxylic acid-based curing agents. Preferred are amine curing agents, such as aliphatic, alicyclic, aromatic, and heterocyclic amine curing agents.

Examples of the aliphatic amine curing agents include alkylene polyamine and polyalkylene polyamine.

Examples of the alkylene polyamine include compounds represented by a formula: $H_2N-R^1-NH_2$ ($R^1$ represents a divalent hydrocarbon group having 1 to 12 carbon atoms, and an arbitrary hydrogen atom of the hydrocarbon group may be substituted with a hydrocarbon group having 1 to 10 carbon atoms). Specific examples of such compounds include methylene diamine, ethylene diamine, 1,2-diaminopropane, 1,3-diaminopropane, 1,4-diaminobutane 1,5-diaminopentane, 1,6-diaminohexane, 1,7-diaminoheptane, 1,8-diaminooctane, 1,9-diaminononane, 1,10-diaminodecane, and trimethyl hexamethylene diamine.

Examples of the polyalkylene polyamine include compounds represented by a formula: $H_2N-(C_mH_{2m}NH)_nH$ (m represents an integer of from 1 to 10, and n represents an integer of from 2 to 10, and preferably from 2 to 6). Specific examples of such compounds include diethylene triamine, dipropylene triamine, triethylene tetramine, tripropylene tetramine, tetraethylene pentamine, tetrapropylene pentamine, pentaethylene hexamine, and nonaethylene decamine.

Examples of aliphatic amine curing agents other than these include tetra(aminomethyl)methane, tetrakis(2-aminoethylaminomethyl)methane, 1,3-bis(2'-aminoethylamino)propane, triethylene-bis(trimethylene)hexamine, bis(3-aminoethyl)amine, and bis(hexamethylene)triamine.

Specific examples of the alicyclic amine curing agents include 1,4-cyclohexanediamine, 4,4'-methylenebiscyclohexylamine, 4,4'-isopropylidenebiscyclohexylamine, norbornanediamine, bis(aminomethyl)cyclohexane, diaminodicyclohexylmethane, isophoronediamine, and menthenediamine (MDA).

Examples of the aromatic amine curing agents include bis(aminoalkyl)benzene, bis(aminoalkyl)naphthalene, and aromatic polyamine compounds containing two or more primary amino groups bound to benzene ring.

More specific examples of the aromatic amine curing agents include bis(cyanoethyl)diethylenetriamine, o-xylylenediamine, m-xylylenediamine (MXDA), p-xylylenediamine, phenylenediamine, napthylenediamine, diaminodiphenylmethane, diaminodiethylphenylmethane, 2,2-bis(4-aminophenyl)propane, 4,4'-diaminodiphenylether, 4,4'-diaminobenzophenone, 4,4'-diaminodiphenylether, 4,4'-diaminodiphenylsulfone, 2,2'-dimethyl-4,4'-diaminodiphenylmethane, 2,4'-diaminobiphenyl, 2,3'-dimethyl-4,4'-diaminobiphenyl, 3,3'-dimethoxy-4,4'-diaminobiphenyl, bis(aminomethyl)naphthalene, and bis(aminoethyl)naphthalene.

Specific examples of the heterocyclic amine curing agents include N-methylpiperazine, morpholine, 1,4-bis-(3-aminopropyl)-piperazine, piperazine-1,4-diazacycloheptane, 1-(2'-aminoethylpiperazine), 1-[2'-(2''-aminoethylamino)ethyl]piperazine, 1,11-diazacycloeicosane, and 1,15-diazacyclooctacosane.

Other examples of the amine curing agents that can be used include amines (amine compounds) mentioned in JP-B-S49-48480. Still other examples of the amine curing agents include diethylaminopropylamine and polyether diamine.

Furthermore, additional examples of the amine curing agents include modified products of the above-mentioned amine curing agents, such as polyamide, polyamideamine (polyamide resin), amine adducts with epoxy compound, Mannich compounds (example: Mannich-modified polyamideamine), Michael adducts, ketimine, aldimine, and phenalkamine.

Examples of the carboxylic acid-based curing agents include phthalic anhydride, tetrahydrophthalic anhydride, methyltetrahydrophthalic anhydride, 3,6-endomethylene tetrahydrophthalic anhydride, hexachloroendomethylene tetrahydrophthalic anhydride, and methyl-3,6-endomethylene tetrahydrophthalic anhydride.

The curing agent (b) may be obtained by synthesizing using a conventionally known method or may be a commercially available product.

Examples of the commercially available product include an aliphatic polyamine: "ACI HARDENER K-39" (manufactured by PTI JAPAN Corporation), polyamideamines: "PA-66", "PA-23", and "PA-290(A)" (all of which are manufactured by Ohtake-Meishin Chemical Co., Ltd.), a modified polyamine: "MAD-204(A)" (manufactured by Ohtake-Meishin Chemical Co., Ltd.), a Mannich-modified polyamideamine: "ADEKA HARDENER EH-342W3" (manufactured by ADEKA Co., Ltd.), a Mannich-modified aliphatic polyamine: "SUNMIDE CX-1154" (manufactured by Sanwa Chemical Industry Co., Ltd.), and a phenalkamine adduct: "CARDOLITE NC556X80" (manufactured by Cardolite Corporation). The curing agent (b) may be used as one kind alone or in combination of two or more kinds.

The amine curing agent has an active hydrogen equivalent of preferably from 50 to 1000 and more preferably from 80 to 400, from viewpoints such as anticorrosive properties.

In the composition of the present invention, the curing agent (b) is contained preferably in an amount of from 1 to 60% by weight, and more preferably in an amount of from 2 to 40% by weight.

In the composition of the present invention, the curing agent (b) and the epoxy resin (a) are preferably used in such amounts that an equivalent ratio therebetween (an active hydrogen equivalent/epoxy equivalent) is preferably from 0.3 to 1.5 and more preferably from 0.4 to 1.0. The amounts within those ranges are preferred from viewpoints such as that complete curing is possible at a desired rate and excellent anticorrosiveness is achieved.

When the composition of the present invention is a two-component composition comprising a main agent component and a curing agent component (namely, composition to be prepared by mixing individual components of the two-component paint) or a multi-component composition (namely, composition to be prepared by mixing individual components of the multi-component paint), the curing agent (b) is contained in the curing agent component, and is desirably contained therein in an amount of preferably from 5 to 100% by weight, and more preferably from 10 to 100% by weight.

The curing agent component is preferably the one prepared so as to be used in an amount of from 50 to 100% as a nonvolatile content (a solid content) resulting from the reaction of the curing agent (b) with the epoxy resin (a) followed by curing. A viscosity of the curing agent component thus prepared which is measured by an E-type viscometer is preferably 100000 mPa·s/25° C. or less and more preferably from 50 to 10000 mPa·s/25° C., from viewpoints such as that excellent handleability and coatability.

The nonvolatile content (solid content) meant herein is a component that after the formation of the coating film becomes a solid content, or is a component forming a dry coating film, for example referring to residues given through being left still at 23° C. for 24 hours under ordinary pressure for natural drying.

<Poly-α-olefin (c)>

The poly-α-olefin (c) comprises a structural unit derived from an α-olefin having 6 or more carbon atoms, wherein the structural unit derived from the α-olefin preferably represents 50 to 100 mol %, and more preferably 70 to 100 mol %.

The structural unit derived from α-olefins (mol %) contained in the poly-α-olefin (c) is calculated by conventional measurement method using $^{13}C$-NMR.

A weight-average molecular weight of the poly-α-olefin (c) is preferably 2000 or more, more preferably from 2000 to 100000, and particularly preferably from 2000 to 20000.

The poly-α-olefin (c) desirably has a viscosity of not more than 4000 mPa·s/25° C. The poly-α-olefin (c) desirably has a kinematic viscosity (100° C.) of not more than 300 mm$^2$/s, and desirably has a flash point of not less than 220° C.

The poly-α-olefin (c) is synthesized by using an a-olefin having 6 or more carbon atoms. Reaction occurring primarily in a carbon (α-position)-carbon (β-position) double bond of the α-olefin leads to the formation of main chains, with side chains having a hydrocarbon group having 3 or more carbon atoms. Preferred as the hydrocarbon group are linear or branched alkyl groups having 3 or more carbon atoms, more preferably those having 3 to 18 carbon atoms, and particularly preferably those having 6 to 10 carbon atoms, from viewpoints such as that there can be obtained an anticorrosive coating composition excellent in defoaming properties.

If the poly-α-olefin (c) does not have a hydrocarbon group having 3 or more carbon atoms as its side chains or the poly-α-olefin (c) has a weight-average molecular weight of less than 2000, defoaming properties tend to be inferior.

Preferred examples of the α-olefin are linear or branched ones, particularly linear ones, having a C-C double bond at a terminal thereof, with a carbon number of 6 or more, preferably a carbon number of 6 to 20, and more preferably a carbon number of 8 to 12. If the carbon number is not more than 5, defoaming properties are inferior.

Preferably, the α-olefin does not contain, in its molecules, any cyclic structures such as alicyclic structures and aromatic structures, or any polar groups such as a hydroxy group.

Specific examples of the α-olefin include 1-hexene, 1-octene, 1-decene, 1-dodecene, 1-tetradecene, 1-hexadecene and 1-octadecene. Among these, more preferred are 1-octene, 1-decene and 1-dodecene from the viewpoint that excellent defoaming properties are achieved. These compounds may be used singly, or may be used as a mixture of two or more kinds. As long as these compounds have a C—C double bond at a terminal thereof, these compounds may have any structure in their possible isomer structures, and may have a branched structure or a linear structure. Two or more kinds of structural isomers and double bond positional isomers thereof may be used in combination.

As the poly-α-olefin, a homopolymer or a copolymer, composed of at least one kind of the α-olefins, can be mentioned. Typical examples thereof include a homopolymer obtained from 1-decene, and copolymers obtained from at least two kinds selected from 1-decene, 1-octene and 1-dodecene.

The poly-α-olefin (c) may be obtained by synthesizing using a conventionally known method or may be a commercially available product. Examples of commercially available products that are preferred as the poly-α-olefin (c) are poly-α-olefins such as "SpectraSyn 40"(weight-average molecular weight 3200, viscosity 870 mPa·s/25° C., polymer obtained from 1-octene, 1-decene and 1-dodecene), "SpectraSyn Elite150"(weight-average molecular weight 7600, viscosity 3780 mPa·s/25° C., polymer obtained from 1-octene, 1-decene and 1-dodecene), "SpectraSyn Elite65" (weight-average molecular weight 4400, viscosity 1410 mPa·s/25° C., polymer obtained from 1-octene, 1-decene and 1-dodecene) (manufactured by ExxonMobil Chemical Company). Such a poly-α-olefin (c) may be used as one kind alone or in combination of two or more kinds.

The poly-α-olefin (c) is contained in an amount of from 0.01 to 5 parts by weight (nonvolatile content), preferably 0.05 to 3 parts by weight, and still more preferably 0.05 to 1 part by weight (nonvolatile content), with respect to 100 parts by weight of a nonvolatile content (solid content) in the composition of the present invention. The amounts within the above ranges are preferred in that bubbles can be inhibited on the surfaces of the coating film. If the poly-α-olefin (c) is contained in an amount exceeding 5 parts by weight (nonvolatile content), the resultant anticorrosive coating film may have somewhat lower anticorrosiveness.

Such a poly-α-olefin (c) may be contained in the main agent component or may be contained in the curing agent, when the composition of the present invention is a two-component anticorrosive coating composition (namely, anticorrosive coating composition to be prepared by mixing individual components of the two-component paint).

The poly-α-olefin (c) may be contained in the main agent or may be contained in the curing agent, or may be contained in other component(s), when the composition of the present invention is a multi-component anticorrosive coating composition (namely, composition to be prepared by mixing individual components of the multi-component paint).

The composition of the present invention, because of containing such a poly-α-olefin (c), gives a coating film whose surfaces hardly have stabilized bubbles remaining thereon. Such an effect is more noticeable when the composition of the present invention contains the amide wax (e) and the liquid acrylic polymer (f), described later.

Reason for the exhibition of such an effect is considered to be as follows: bubbles, occurring as a result of e.g., bubble entrapping at the time of coating using a brush or a roller, are stabilized by the presence of resins having a hydrophilic group and a hydrophobic group in the coating composition or by the additives in the composition being arranged onto the surfaces of the coating film, but that stabilization of the bubbles are inhibited when that arrangement is disturbed by the poly-α-olefin (c), which is incompatible with those resins or additives.

The liquid acrylic polymer, in particular, easily comes to be arranged onto the surface of the coating film, being apt to stabilize the bubbles, but the stabilization of the bubbles can be effectively inhibited by the poly-a-olefin (c).

<Other Components>

The composition of the present invention may include, in addition to the (a) to (c), a silane coupling agent (d), an amide wax (e), a liquid acrylic polymer (f) and an extender pigment (g), a coloring pigment, an anti-sagging and anti-settling agent, a solvent, a plasticizer, a curing accelerator, an inorganic dehydrating agent (stabilizer), an antifouling agent, or the like, as needed, as long as the object of the invention is not impaired.

These other components may be conventionally known ones that are used in anticorrosive coating compositions.

(Silane Coupling Agent (d))

The use of the silane coupling agent (d) can further improve not only the adhesion of an obtained anticorrosive coating film to a substrate, but also anticorrosive properties of the obtained anticorrosive coating film, such as salt water resistance. Thus, the composition of the present invention preferably comprises the silane coupling agent (d).

Such a silane coupling agent may be used as one kind alone or in combination of two or more kinds.

The silane coupling agent (d) is not particularly limited and can be a conventionally known one. The silane coupling agent (d) is preferably a compound that contains at least two functional groups in one molecule and can contribute to improvement in adhesion to a substrate, reduction in the viscosity of the composition, and the like, and more preferably a compound represented by a formula: X-Si (OR)$_3$, wherein X represents a functional group capable of reacting with an organic substance such as an amino group, a vinyl group, an epoxy group, a mercapto group, an isocyanate group, a methacryl group, a ureido group, a sulfur group or a hydrocarbon group containing any of these groups, in which the hydrocarbon group may have an ether bond or the like, or represents an alkyl group; and OR represents a hydrolyzable group such as a methoxy group or an ethoxy group.

Specific examples of preferable silane coupling agents include "KBM 403" (γ-glycidoxypropyltrimethoxysilane manufactured by Shin-Etsu Chemical Co., Ltd.) and "SILA-ACE S-510" (manufactured by JNC Corporation).

When the silane coupling agent (d) is incorporated into the composition of the present invention, an amount of the silane coupling agent (d) to be incorporated is preferably from 0.1 to 10 parts by weight and more preferably from 0.3 to 5 parts by weight with respect to 100 parts by weight of a nonvolatile content in the composition of the invention. The use of the composition including the silane coupling agent (d) in such an amount improves the performances of an anticorrosive coating film such as adhesion to a substrate, and can reduce the viscosity of the composition of the invention, thus improving coating workability.

<Amide Wax (e)>

The amide wax (e) is not particularly limited and examples of the amide wax (e) include amide waxes synthesized from vegetable oil fatty acids and amines.

Such an amide wax (e) may be obtained by synthesizing using a conventionally known method or may be a commercially available product. Examples of the commercially available product include "DISPARLON A630-20X" and "DISPARLON 6650" manufactured by Kusumoto Chemicals, Ltd., and "ASA T-250F" manufactured by Itoh Oil Chemicals Co., Ltd. The amide wax (e) may be used as one kind alone or in combination of two or more kinds.

To improve the anti-sagging of such a coating composition on a substrate, anti-sagging and anti-settling agents (thixotropic agents) have been conventionally used, for which various compounds are known. From viewpoint such as excellence in anti-sagging effect, it is preferred to use amide wax.

In the composition of the present invention, the content (nonvolatile content) of the amide wax (e) is preferably from 0.05 to 15 parts by weight, more preferably from 0.3 to 5 parts by weight, and still more preferably from 0.5 to 3 parts by weight, with respect to 100 parts by weight of the nonvolatile content in the composition of the present invention.

(Liquid Acrylic Polymer (f))

The liquid acrylic polymer (f) comprises a structural unit derived from an acrylate having an alkyl group of 4 to 18 carbon atoms.

The composition of the present invention preferably includes such an acrylic polymer (f) that is liquid at room temperature (15 to 25° C.). By using the liquid acrylic polymer (f), spray dust occurring from the composition of the invention hardly reduces adhesion of a film to be formed thereon to an object to be coated even when the amide wax is contained.

Therefore, the composition of the present invention is excellent in anticorrosive properties, in adhesion to a substrate (particularly, anti-sagging properties), and in the properties that spray dust of the composition hardly reduces adhesion of a film to be formed thereon to an object to be coated even when the composition has attached to the substrate as the spray dust.

The composition of the present invention exhibiting the above advantageous effects can be obtained when the liquid acrylic polymer (f) is neither solid nor semi-solid, but is liquid under room temperature; is a polymer whose main raw material is not methacrylate but acrylate; and is not a polymer including no structural units derived from an acrylate having an alkyl group of 4 to 18 carbon atoms but a polymer including a structural unit derived from an acrylate having an alkyl group of 4 to 18 carbon atoms.

Examples of the liquid acrylic polymer (f) include homopolymers or copolymers of acrylates having an alkyl group of 4 to 18 carbon atoms, such as n-butyl acrylate, iso-butyl acrylate, tert-butyl acrylate, 2-ethylhexyl acrylate, hexyl acrylate, heptyl acrylate, n-octyl acrylate, isooctyl acrylate, n-nonyl acrylate, isononyl acrylate, decyl acrylate, lauryl acrylate, tridecyl acrylate, and stearyl acrylate. Particularly preferred are a homopolymer of isobutyl acrylate or 2-ethylhexyl acrylate, or a copolymer thereof.

The liquid acrylic polymer (f) has a glass transition temperature of preferably 0° C. or less and more preferably −30° C. or less, from viewpoints such as that there can be obtained a composition whose spray dust hardly reduces adhesion of a film to be formed thereon to an object to be coated even when the composition has attached to the substrate as the spray dust. Such a glass transition temperature can be measured by using DSC (a differential scanning calorimeter).

A weight-average molecular weight of the liquid acrylic polymer (f) measured by GPC is preferably from 1000 to 100000 and more preferably from 1000 to 30000, from viewpoints such as that there can be obtained a composition that is excellent in adhesion to a substrate and whose spray dust hardly reduces adhesion of a film to be formed thereon to an object to be coated even when the composition has attached to the substrate as the spray dust.

A viscosity of an acrylic polymer solution prepared by diluting the liquid acrylic polymer (f) with an equivalent weight of butyl acetate, measured by an E-type viscometer, varies depending on an average molecular weight of the polymer. The viscosity thereof is preferably from 5 to 3000 mPa·s/25° C. and more preferably from 5 to 300 mPa·s/25° C., from viewpoints such as that there can be obtained a composition that is excellent in adhesion to a substrate and whose spray dust hardly reduces adhesion of a film to be formed thereon to the object to be coated even when the composition has attached to the substrate as the spray dust.

The liquid acrylic polymer (f) may be obtained by synthesizing using a conventionally known method or may be a commercially available product.

The liquid acrylic polymer (f) can be synthesized by reacting the acrylate having an alkyl group of 4 to 18 carbon atoms with other monomer(s) used as needed, and if needed adding an additive such as a polymerization initiator, in the presence of an organic solvent under heating at from 30 to 180° C. for from about 2 to 18 hours.

In this reaction, the monomer to be used in the reaction is preferably used in such an amount that the obtained liquid acrylic polymer (f) contains a structural unit derived from the monomer in an amount within a range mentioned later.

The organic solvent is not particularly limited. Examples of the organic solvent include aromatic hydrocarbon-based solvents such as toluene and xylene, ketone-based solvents such as methyl ethyl ketone and methyl isobutyl ketone, ester-based solvents such as butyl acetate, alcohol-based solvents such as isopropanol, a mineral spirit, and aliphatic hydrocarbon-based solvents such as n-hexane, n-octane, 2,2,2-trimethylpentane, isooctane, n-nonane, cyclohexane, and methylcyclohexane. These may be used as one kind alone or in combination of two or more kinds.

In the composition of the present invention, a varnish including the liquid acrylic polymer (f) obtained in the above reaction may be used as it is, or a product obtained by removing the polymerization initiator from the varnish may be used. Accordingly, as the organic solvent, it is preferable to use the same compound as any of solvents described later that can be used in the composition of the present invention.

The polymerization initiator is not particularly limited. Examples of the polymerization initiator that can be used include azo-based initiators such as azobisisobutyronitrile, 2,2-azobis(2-methylbutyronitrile), 2,2-azobis(2-methylpropionitrile), 2,2-azobis(2,4-dimethylvaleronitrile) and peroxide-based initiators such as benzoyl peroxide, t-butyl peroxyoctanoate, diisobutyl peroxide, di-(2-ethylhexyl) peroxypivalate, decanoyl peroxide, t-butylperoxy-2-ethylhexanoate, and t-butylperoxy benzoate. These may be used as one kind alone or in combination of two or more kinds.

The content (nonvolatile content) of the liquid acrylic polymer (f) in the composition of the present invention is preferably from 0.01 to 5 parts by weight, more preferably from 0.03 to 5 parts by weight, and still more preferably from 0.05 to 2 parts by weight with respect to 100 parts by weight of a nonvolatile content in the composition of the invention. When the composition of the present invention includes the liquid acrylic polymer (f) in such an amount, spray dust formed from the composition hardly reduces adhesion of a film to be formed thereon to an object to be coated, even when the amide wax is contained in the composition.

The liquid acrylic polymer (f) may be a copolymer of the acrylate having an alkyl group of 4 to 18 carbon atoms and other monomer(s) copolymerizable with the acrylate.

Examples of the other monomer(s) copolymerizable with the acrylate having an alkyl group of 4 to 18 carbon atoms include (meth)acrylic acid ester monomers such as methyl (meth) acrylate, ethyl (meth) acrylate, 2-methoxyethyl (meth) acrylate, 2-ethoxyethyl (meth) acrylate, phenoxyethyl (meth)acrylate, 2-(2-ethylhexaoxy)ethyl (meth)acrylate, 1-methyl-2-methoxyethyl (meth) acrylate, 3-methoxybutyl (meth)acrylate, 3-methyl-3-methoxybutyl (meth) acrylate, m-methoxyphenyl (meth)acrylate, p-methoxyphenyl (meth)acrylate, o-methoxyphenyl ethyl (meth)acrylate, m-methoxyphenyl ethyl (meth)acrylate, p-methoxyphenyl ethyl (meth) acrylate, n-propyl (meth) acrylate, iso-propyl (meth)acrylate, n-butyl methacrylate, iso-butyl methacrylate, tert-butyl methacrylate, 2-ethylhexyl methacrylate, lauryl methacrylate, stearyl methacrylate, benzyl (meth)acrylate, phenyl (meth)acrylate, isobornyl (meth) acrylate, cyclohexyl (meth) acrylate, glycidyl (meth)acrylate, dicyclopentenyl (meth)acrylate, and 2-dicyclopentenoxy ethyl (meth)acrylate; hydroxyl group-containing monomers such as 2-hydroxyethyl (meth)acrylate, 2-hydroxypropyl (meth) acrylate, 3-hydroxypropyl (meth)acrylate, 2-hydroxybutyl (meth)acrylate and 4-hydroxybutyl (meth)acrylate; adducts of 2-hydroxyethyl (meth)acrylate and ethylene oxide, propylene oxide, γ-butyrolactone, ε-caprolactone, or the like; dimers or trimmers of 2-hydroxyethyl (meth)acrylate, 2-hydroxypropyl (meth)acrylate, or the like; monomers having a plurality of hydroxyl groups such as glycerol (meth)acrylates; primary or secondary amino group-containing vinyl monomers such as buthylaminoethyl methacrylate and (meth) acrylamide; tertiary amino group-containing vinyl monomers such as dimethylaminoethyl (meth) acrylate, diethylaminoethyl (meth) acrylate, dimethylaminopropyl (meth) acrylate, dimethylaminobutyl (meth) acrylate, dibutylaminoethyl methacrylate, dimethylaminoethyl (meth) acrylamide, and dimethylaminopropyl (meth) acrylamide; heterocyclic-based basic monomers such as vinylpyrrolidone, vinylpyridine, and vinylcarbazole; and vinyl-based monomers such as stylene, vinyl toluene, α-methyl stylene, (meth)acrylonitrile, vinyl acetate, and vinyl propionate.

The other monomer(s) copolymerizable with the acrylate having an alkyl group of 4 to 18 carbon atoms can be used by selecting only one kind or a combination of two or more kinds as needed.

When the liquid acrylic polymer (f) is a copolymer of the acrylate having an alkyl group of 4 to 18 carbon atoms and other monomer(s) copolymerizable with the acrylate, the term "acrylic polymer" means a polymer obtained by using the acrylate and if any, an acrylate contained in said copolymerizable other monomer(s), as a raw material monomer for synthesizing the copolymer, in an amount, or in a total amount if said other monomer(s) contains the acrylate, which is 55% by weight or more, preferably 70% by weight or more, and still more preferably 80% by weight or more, with respect to 100% by weight of the raw material monomer for the synthesis.

The alkyl group of 4 to 18 carbon atoms is preferably an alkyl group of 4 to 12 carbon atoms and more preferably an alkyl group of 4 to 8 carbon atoms, from viewpoints such as that there can be obtained a composition having well-balanced excellence in adhesion to a substrate (particularly, anti-sagging properties) and the properties that spray dust of the composition hardly reduces adhesion of a film to be formed thereon to an object to be coated even when the composition has attached to the substrate as the spray dust.

The liquid acrylic polymer (f) includes preferably a structural unit derived from an acrylate having an alkyl group of 4 to 18 carbon atoms that has a branched structure; preferably a structural unit derived from an acrylate having an alkyl group of 4 to 12 carbon atoms that has a branched structure; more preferably a structural unit derived from isobutyl acrylate or 2-ethylhexyl acrylate; particularly preferably a structural unit derived from isobutyl acrylate or 2-ethylhexyl acrylate and a structural unit derived from n-butyl acrylate; and particularly preferably structural units derived from isobutyl acrylate and n-butyl acrylate or a structural unit derived from 2-ethylhexyl acrylate, from viewpoints such as that there can be obtained a composition having well-balanced excellence in adhesion to a substrate and the properties that spray dust of the composition hardly reduces adhesion of a film to be formed thereon to an object to be coated even when the composition has attached to the substrate as the spray dust. In another preferable embodiment, the liquid acrylic polymer comprises structural units derived from isobutyl acrylate, n-butyl acrylate and 2-ethylhexyl acrylate.

When the liquid acrylic polymer (f) includes the structural unit derived from an acrylate having an alkyl group of 4 to 18 carbon atoms having a branched structure, the liquid acrylic polymer (f) includes the structural unit derived from an acrylate having an alkyl group of 4 to 18 carbon atoms having a branched structure in an amount of preferably from 30 to 100% by weight, more preferably from 40 to 100% by weight, and particularly preferably from 50 to 100% by weight with respect to a total 100% by weight of the liquid acrylic polymer (f), from viewpoints such as that there can be obtained a composition that is much superior in adhesion to a substrate and anticorrosive properties and whose spray dust hardly reduces adhesion of a film to be formed thereon to an object to be coated even when the composition has attached to the substrate as the spray dust. Due to the same reasons, the liquid acrylic polymer (f) includes the structural unit derived from isobutyl acrylate or 2-ethylhexyl acrylate in an amount of preferably from 30 to 100% by weight, more preferably from 40 to 100% by weight, and particularly preferably from 45 to 100% by weight.

When the liquid acrylic polymer (f) includes the structural unit (i) derived from isobutyl acrylate or 2-ethylhexyl acrylate and the structural unit (ii) derived from n-butyl acrylate, the liquid acrylic polymer (f) preferably includes the structural units (i) and (ii) such that a total of the structural units (i) and (ii) is preferably from 30 to 100% by weight, more preferably from 50 to 100% by weight, and particularly preferably from 75 to 100% by weight with respect to a total 100% by weight of the liquid acrylic polymer (f) and such that a ratio of the structural unit (i) to the structural unit (ii) (the structural unit (i): the structural unit (ii)) is preferably from 10:90 to 99:1 and more preferably from 10:90 to 90:10 (provided that the total of the structural units (i) and (ii) is 100), from viewpoints such as that there can be obtained a composition that is much superior in adhesion to a substrate and anticorrosive properties and whose spray dust hardly reduces adhesion of a film to be formed thereon to an object to be coated even when the composition has attached to the substrate as the spray dust.

(Extender Pigment (g))

The use of the extender pigment (g) can not only be cost-effective for a composition to be obtained, but also can lead to the formation of an anticorrosive coating film excellent in anticorrosive properties, salt water resistance, and high humidity resistance at a high temperature, and the like. Therefore, the composition of the present invention preferably comprises the extender pigment (g).

Specific examples of the extender pigment (g) include barium sulphate, potassium feldspar, barite powder, silica, calcium carbonate, talc, mica, and glass flake. Such an extender pigment (g) may be used as one kind alone or in combination of two or more kinds.

The composition of the present invention preferably comprises at least a flaky pigment (h) as the extender pigment (g), from viewpoints such as that there can be formed an anticorrosive coating film much superior in anticorrosive properties, salt water resistance, high humidity resistance at a high temperature, and the like.

Examples of such a flaky pigment (h) include mica and glass flake. Mica is preferable from viewpoints such as that it is easily available at low cost and there can be formed an anticorrosive coating film much superior in terms of the above-mentioned effects. The flaky pigment (h) may be used as one kind alone or in combination of two or more kinds.

The mica is preferably mica having a high aspect ratio of from 30 to 90, from viewpoints such as improvement in blistering resistance, reduction in creeping properties, and relaxation of internal stress in an anticorrosive coating film to be obtained. Examples of such mica having a high aspect ratio include "SUZORITE MICA 200HK" (manufactured by Western Japan Trading Co., Ltd., aspect ratio: from 40 to 60).

When the extender pigment (g) is incorporated into the composition of the present invention, an amount of the extender pigment (g) to be incorporated is preferably from 5 to 80 parts by weight and more preferably from 10 to 70 parts by weight with respect to 100 parts by weight of a nonvolatile content in the composition of the invention.

When the flaky pigment (h) is incorporated as the extender pigment (g), an amount of the flaky pigment (h) to be incorporated is preferably from 1 to 40 parts by weight and more preferably from 3 to 20 parts by weight with respect to 100 parts by weight of a nonvolatile content in the composition of the present invention, from viewpoints such as improvement in the performances of an anticorrosive coating film, such as water-resistant and anticorrosive properties and bending resistance.

(Coloring Pigment)

Examples of the coloring pigment include titanium white, red iron oxide, yellow iron oxide and carbon black.

The coloring pigment may be used as one kind alone or in combination of two or more kinds.

When the coloring agent is incorporated into the composition of the present invention, an amount of the coloring agent to be incorporated is preferably from 0.1 to 15 parts by weight and more preferably from 0.5 to 10 parts by weight with respect to 100 parts by weight of a nonvolatile content in the composition of the invention.

The extender pigment (g) and the coloring pigment are preferably contained in the composition of the present invention in such amounts that an anticorrosive coating film formed from the composition of the present invention has a pigment volume concentration (PVC) of preferably from 10 to 75% by volume and preferably from 25 to 50% by volume, from viewpoints such as anticorrosive properties.

(Anti-Sagging and Anti-Settling Agent)

The anti-sagging and anti-settling agent (a compound other than the amide wax (e)) can provide thixotropy to the composition of the present invention to improve the adhesion of the composition to a substrate. Although the amide wax (e) also represents an anti-sagging and anti-settling agent, the composition of the present invention may further comprise an anti-sagging and anti-settling agent as needed.

The anti-sagging and anti-settling agent is not particularly limited and examples thereof include organic thixotropic agents and inorganic thixotropic agents. The anti-sagging and anti-settling agent may be used as one kind alone or in combination of two or more kinds.

Examples of the organic thixotropic agents include hydrogenated castor oil-based, oxidized polyethylene-based, vegetable oil polymerized oil-based and surfactant-based thixotropic agents as well as thixotropic agents combining two or more kinds thereof.

Examples of the inorganic thixotropic agents include a fine powdered silica, bentonite, a silica having a surface treated with a silane compound or the like, a bentonite having a surface treated with quaternary ammonium salt or the like (organic bentonite), a ultrafine surface-treated calcium carbonate, and mixtures thereof. Specific examples of the inorganic thixotropic agents include silica fine powder obtained by micronization by a drying method [for example, product name: AEROSIL 300, manufactured by Nippon Aerosil Co., Ltd.], fine powder obtained by modifying silica fine powder with hexamethyldisilazane [for example, product name: AEROSIL RX300, manufactured by Nippon Aerosil Co., Ltd.], fine powder obtained by modifying silica fine powder with polydimethylsiloxane [for example, product name: AEROSIL RY300, manufactured by Nippon Aerosil Co., Ltd.], a hydrophobic fine powdered silica obtained by modifying silica fine powder with dimethyldichlorosilane [for example, product name: AEROSIL R972, manufactured by Nippon Aerosil Co., Ltd.], and organic bentonite (product name: BENTONE SD-2, manufactured by Elementis Specialties, Inc).

Among them, a combination of the silica having a surface treated with a silane compound or the like and the bentonite having a surface treated with quaternary ammonium salt or the like is preferably used as the anti-sagging and anti-settling agent, from viewpoints such as that there can be obtained a composition excellent in adhesion to a substrate.

When the anti-sagging and anti-settling agent is incorporated in the composition of the present invention, an amount of the anti-sagging and anti-settling agent to be incorporated is preferably from 0.1 to 5 parts by weight and more preferably from 0.3 to 2 parts by weight with respect to 100 parts by weight of a nonvolatile content in the composition of the invention, from viewpoints such as that there can be obtained a composition excellent in coating material viscosity, coating workability, and storage stability.

A total content of the amide wax (e) and the anti-sagging and anti-settling agent in the composition of the present invention is preferably from 0.3 to 6 parts by weight and more preferably from 0.5 to 3 parts by weight with respect to 100 parts by weight of a nonvolatile content in the composition of the invention, from viewpoints such as that there can be obtained a composition excellent in anti-sagging properties.

In this case, the amide wax (e) and the anti-sagging and anti-settling agent are desirably contained such that a mass ratio between the contents of the amide wax (e) and the anti-sagging and anti-settling agent (the content of the amide wax (e): the content of the anti-sagging and anti-settling agent) in the composition of the present invention is preferably from 10:90 to 90:10 and more preferably from 15:85 to 85:15 (provided that the total content of the amide wax (e) and the anti-sagging and anti-settling agent is 100).

(Solvent)

The solvent is not particularly limited and may be a conventionally known one. Examples thereof include xylene, toluene, methyl isobutyl ketone, methyl ethyl ketone, butyl acetate, butanol, isopropyl alcohol and 1-methoxy-2-propanol.

These solvents may be used as one kind alone or in combination of two or more kinds.

When the solvent is incorporated into the composition of the present invention, an amount of the solvent to be incorporated is not particularly limited and can be adjusted as needed depending on a coating method used in the application of the composition of the invention. When considering coatability and the like of the composition of the present invention, the solvent is desirably contained in such an amount that the nonvolatile content in the composition of the invention has a concentration of preferably from 55 to 98% by weight and more preferably from 65 to 95% by weight.

When the composition of the present invention is used for spray coating, the solvent is desirably contained in such an amount that the nonvolatile content in the composition of the invention has a concentration of preferably from 55 to 95% by weight and more preferably from 65 to 90% by weight, from viewpoints such as coatability.

(Plasticizer)

The composition of the present invention preferably comprises a plasticizer, from viewpoints such as improvement in flexibility and weather resistance of an anticorrosive coating film to be obtained. The plasticizer may be used as one kind alone or in combination of two or more kinds.

The plasticizer can be selected from a wide range of conventionally known ones, and examples thereof include liquid hydrocarbon resins such as low boiling point fractions or the like obtained by thermal decomposition of naphtha, petroleum resins that are solid under room temperature, xylene resins, and coumarone-indene resins. Specific examples thereof include liquid hydrocarbon resins and flexibility-imparting resins described in JP-A-2006-342360.

Among them, preferred are petroleum resins that are solid under room temperature, xylene resins and coumarone-indene resins, each of which contains a hydroxyl group, and liquid hydrocarbon resins from viewpoints such as good compatibility with the epoxy resin (a).

Examples of commercially available products of the liquid hydrocarbon resins include "NECIRES EPX-L" and "NECIRES EPX-L2" (both of which are phenol-modified hydrocarbon resins manufactured by NEVCIN Polymers B.V.), "HIRENOL PL-1000S" (a liquid hydrocarbon resin manufactured by Kolon Chemical Co., Ltd.). Examples of commercially available products of the petroleum-based resins that are solid under room temperature include "NEO POLYMER E-100", "NEO POLYMER K-2", and "NEO POLYMER K-3" (all of which are C9-based hydrocarbon resins manufactured by Nippon Petrochemicals Co., Ltd.); examples of commercially available products of the coumarone-indene resins include "NOVARES CA 100" (manufactured by Rutgers Chemicals AG); and examples of commercially available products of the xylene resins include "NIKANOL Y-51" (manufactured by Mitsubishi Gas Chemical Company, Inc).

In incorporating the plasticizer into the composition of the present invention, an amount of the plasticizer to be incorporated is preferably from 1 to 50 parts by weight and more preferably from 3 to 30 parts by weight with respect to 100 parts by weight of the composition of the invention, from viewpoints such as that there can be obtained an anticorrosive coating film excellent in weather resistance, anti-cracking properties, and the like.

(Curing Accelerator)

The composition of the present invention preferably comprises a curing accelerator that can contribute to the adjustment of curing rate, particularly acceleration thereof.

Examples of the curing accelerator include tertiary amines. These curing accelerators may be used as one kind alone or in combination of two or more kinds.

Specific examples thereof include triethanol amine, dialkylaminoethanol, triethylenediamine [1,4-diazacyclo(2,2,2)octane], 2,4,6-tri(dimethylaminomethyl)phenol (examples: product name "VERSAMINE EH30" (manufactured by BASF Japan Ltd.) and product name "ANCAMINE K-54" (manufactured by Air Products Japan, Inc.)). These curing accelerators are preferably contained in an amount of from 0.05 to 2.0% by weight in the composition of the present invention.

When the composition of the present invention is a two-component composition composed of the main agent component and the curing agent component (namely, composition to be prepared by mixing individual components of the two-component paint) or a multi-component composition (namely, composition to be prepared by mixing individual components of the multi-component paint), it is desirable that the curing accelerator is contained in the curing agent component, and contained therein in an amount of preferably from 0.1 to 15% by weight, and more preferably 0.1 to 10% by weight.

When the anticorrosive coating composition of the present invention is given as a two-component composition composed of a main agent component and a curing agent component (namely, composition to be prepared by mixing individual components of the two-component paint) or as a multi-component composition (namely, composition to be prepared by mixing individual components of the multi-component paint), it is desirable that the composition is prepared appropriately by incorporating the curing agent component in an amount of from 2 to 200 parts by weight, preferably from 5 to 50 parts by weight, and particularly preferably from 8 to 40 parts by weight, with respect to 100 parts by weight of the main agent component such that the volume solid (volume nonvolatile content %) is from 50 to 100% by volume, and preferably from 65 to 85% by volume.

«Anticorrosive Coating Film»

The anticorrosive coating film of the present invention is not particularly limited as long as it is a film formed from the composition of the invention. The anticorrosive coating film of the present invention is preferably a film obtained by applying the composition of the invention on a substrate thereby forming a coating film and then drying and curing the coating film.

Such an anticorrosive coating film as described above has excellent anticorrosive properties such as salt water resistance and high humidity resistance at a high temperature and excellent adhesion to a substrate, and moreover is advantageous in that its surfaces hardly have bubbles remaining thereon even when that coating film is formed by using a brush or a roller.

The substrate is not particularly limited but preferably a substrate for which anticorrosive properties are required, from viewpoints such as that the effects of the present invention can be more exhibited.

As such a substrate, preferred are substrates comprising a material such as steel or non-ferrous metal (e.g., zinc, aluminum and stainless steel). Examples of the substrate include ship and land structures and bridges comprising any of those materials, more preferably the ship structures. Among the ship structures, a ballast tank is more preferred. The ballast tank may be the one subjected to electric anticorrosion treatment by installation of an anode made of zinc, zinc- aluminum, or the like. The electric anticorrosion treatment is performed at a current density of preferably from 1 to 10 $mA/m^2$.

The substrate may be the one whose surface has been treated (for example, blast treatment (ISO 8501-1 Sa2 1/2), a friction method, and an oil and dust removal treatment by degreasing) as needed in order to remove rust, oil and fat, water, dust, slime, salt, or the like and in order to improve the adhesion of an anticorrosive coating film to be obtained. In addition, from viewpoints such as anticorrosive properties, weldability, and shearability of the substrate, the substrate may be the one whose surface when needed has been coated with a coating material for thin-film formation, such as a conventionally known primary rust-preventive coating material (a shop primer), another primer, or the like and then dried.

A method for applying the composition of the present invention on the substrate is not particularly limited, and a conventionally known method may be unlimitedly used.

A method for drying and curing the coating film is not particularly limited. In order to shorten a time for drying and curing, the coating film may be dried and cured by heating at a temperature ranging from about 5 to 60° C. However, usually, the coating film is dried and cured by allowing the film to stand at room temperature in the air for about 1 to 14 days.

«Method for Preventing Corrosion of Substrate»

A method for preventing corrosion of a substrate according to the present invention is not particularly limited as long as the method includes a step of applying the composition of the invention on a substrate. Preferred is a method for preventing corrosion of a substrate in which the composition of the invention is applied on a substrate to form a coating film and then the coating film is dried and cured.

In this method, the substrate, the coating method, and the like may be the same as those described in the section of the anticorrosive coating film.

In the method for preventing corrosion of a substrate, depending on desired purpose, a conventionally known top coating material such as an antifouling coating material may be applied on an obtained coating film or an anticorrosive coating film, dried, and cured.

For example, a method for preventing corrosion of a ballast tank will be performed as follows:

First, a ballast tank is spray-coated with the composition of the present invention (first coating).

After the resultant coating film is dried, stripe coating using a brush or a roller is performed on welding lines and edges, where film thickness is difficult to ensure, and then spray-coating is performed again with the composition used just now (second coating), so that an anticorrosive coating film with a thickness of about 320 µm is formed.

Since such a method for preventing corrosion of a ballast tank as described above necessarily requires stripe coating using a brush or a roller, not just workability of spraying but also workability of coating using a brush or a roller are needed. In addition, the coating film formed through the coating using a brush or a roller needs to be free from defects such as bubbles or pinholes. As described above, even when coating is performed using a brush or a roller, which is likely to cause bubbles on the surfaces of the coating film, the use of the composition of the present invention can inhibit bubbles from occurring on the surfaces of the coating film.

EXAMPLES

Hereinafter, the present invention will be further described with reference to Examples. However, the invention is not limited thereto.

Anticorrosive coating films formed from compositions obtained in Examples and Comparative Examples below were subjected to tests (1) to (6) conducted as follows. Table 2 shows the results.

(1) Coating Film Appearance (Defoaming Properties)

A tin plate with a size of 300 mm×300 mm×0.05 mm (thickness) (hereinafter also referred to as the "test plate") was coated, by using a brush, with a coating material mixture having a viscosity regulated to be 2.0 Pa·s by xylene, so as to give a film thickness ranging from 150 µm to 200 µm. The resultant test plate with a coating film was dried in an atmosphere of 23° C. and 50% RH for 1 day. After that, appearance of the coating film was evaluated.

(Evaluation Criteria)

A: The number of bubbles remaining per 10 $cm^2$ is less than 1.

B: The number of bubbles remaining per 10 $cm^2$ is 1 or more and less than 2.

C: The number of bubbles remaining per 10 $cm^2$ is 2 or more and less than 5.

D: The number of bubbles remaining per 10 $cm^2$ is 5 or more.

(2) Salt Water Resistance Test

Salt water resistance of the anticorrosive coating film was measured in accordance with JIS K-5600 6-1. Specifically, the measurement was conducted as follows:

A steel plate having a size of 150 mm×70 mm×1.6 mm (thickness) subjected to blasting treatment (hereinafter referred to also as the "test plate") was spray-coated with each of the compositions obtained in the Examples and Comparative Examples below, so as to give a dry film thickness of about 250 µm. The test plate with an anticorrosive coating film obtained was dried in an atmosphere of 23° C. and 50% RH for 7 days to produce a test plate with an anticorrosive coating film. The test plate with an anticorrosive coating film was immersed in 3% salt water at 40° C. for 90 days. Thereafter, the appearance of the anticorrosive coating film was visually evaluated according to the following criteria.

(Evaluation Criteria)

A: There are no changes in blistering, cracking, rust, peeling and hue.

B: There are slight defects (changes) in any of blistering, cracking, rust, peeling and hue.

C: There are obvious changes in any of blistering, cracking, rust, peeling and hue.

(3) Electric Anticorrosion Test

A zinc anode was connected to a test plate with an anticorrosive coating film produced in the same manner as in the salt water resistance test so as to give an electric current density of 5 $mA/m^2$ or less, and then the test plate was immersed in 3% salt water at 40° C. for 90 days. After that, the appearance of the anticorrosive coating film was visually evaluated according to the following criteria.

(Evaluation Criteria)

A: There are no changes in blistering, cracking, rust, peeling and hue.

B: There are slight defects (changes) in any of blistering, cracking, rust, peeling and hue.

C: There are obvious changes in any of blistering, cracking, rust, peeling and hue.

(4) Neutral Salt Spray Test

In accordance with JIS K-5600 7-1, a solution with a salt water concentration of 5% was sprayed onto a test plate with an anticorrosive coating film produced in the same manner as in the salt water resistance test, continuously for 90 days under the condition of 35° C. After that, the appearance of the anticorrosive coating film was visually evaluated according to the following criteria.

(Evaluation Criteria)

A: There are no changes in blistering, cracking, rust, peeling and hue.

B: There are slight defects (changes) in any of blistering, cracking, rust, peeling and hue.

C: There are obvious changes in any of blistering, cracking, rust, peeling and hue.

(5) High Humidity Resistance Test at a High Temperature

High humidity resistance at a high temperature of the anticorrosive coating film was measured in accordance with JIS K-5600 7-2. Specifically, the measurement was conducted as follows.

A test plate with an anticorrosive coating film produced in the same manner as in the salt water resistance test was kept in a tester with a temperature of 50° C. and a humidity of 95% for 90 days. After that, the appearance of the anticorrosive coating film was evaluated according to the following criteria.

(Evaluation Criteria)

A: There are no changes in blistering, cracking, rust, peeling and hue.

B: There are slight defects (changes) in any of blistering, cracking, rust, peeling and hue.

C: There are obvious changes in any of blistering, cracking, rust, peeling and hue.

(6) Adhesion to Spray Dust-Attached Surface

Adhesion to a spray dust-attached surface was measured in accordance with JIS K-5400 8.5.3. Specifically, the measurement was conducted as follows.

A test plate having a size of 150×70×1.6 (thickness) mm was placed in such a manner that a surface thereof was substantially vertical with respect to gravity, and then coated with each of the anticorrosive coating compositions obtained in the Examples and Comparative Examples below such that an anticorrosive coating film obtained had a film thickness of 160 μm, thereby obtaining a test plate with a coating film.

A coating film surface of the test plate with a coating film obtained was spray-coated with the same composition as that used to form the coating film, the spray coating being performed at a height of about 1.5 m above the test plate, whereby the composition which would give a spray dust through drying was attached to about 95% or more of a surface area of the coating film. The test plate with the composition that would give a spray dust was dried in an atmosphere of 23° C. and 50% RH for 1 day. The test plate with a dry coating film obtained was, again, spray-coated with the same composition as that used to form the anticorrosive coating film so as to give a dry film thickness of about 160 μm. Thereafter, the test plate was dried in an atmosphere of 23° C. and 50% RH for 7 days to obtain a test plate with anticorrosive coating films having a film thickness of about 320 μm.

The conditions under which the composition that would give a spray dust was attached were conditions reproduced which were similar to an example of spray dust attachment conditions that can occur when the composition of the present invention is used in an actual coating place.

A peeling state between the anticorrosive coating films (peeling ratio) of the resultant test plate with anticorrosive coating films was evaluated according to the following criteria. The evaluation will be described with reference to FIG. 1.

On a surface of anticorrosive coating film 1 of the resultant test plate with anticorrosive coating films, X-shaped incision 2 was formed, and at this time an area within a quadrangle formed by connecting four end portions of the two cuts of the incision 2 was designated as incision-formed area 3.

After that, an adhesive cellophane tape was stuck onto the X-shaped incision and one end of the tape was peeled off at an angle close to 90 degrees with respect to the surface of the anticorrosive coating film to evaluate the peeling state between the anticorrosive coating films (peeling ratio). After the peeling of the tape, a ratio of the anticorrosive coating film peeled off from the test plate with respect to the incision-formed area 3 was visually estimated.

(Evaluation Criteria)

A: No peeling is observed.

B: Not more than 10% of the entire film peels off.

C: More than 10% and not more than 20% of the entire film peels off.

D: More than 20% of the entire film peels off.

Table 1 below shows materials used in Examples and Comparative Examples of the present invention.

TABLE 1

| | |
|---|---|
| (Note 1) | "E-028-90X" (product): Bisphenol A-type liquid epoxy resin, nonvolatile content 90% (manufactured by Ohtake-Meishin Chemical Co., Ltd.) |
| (Note 2) | "E-834-85X" (product): Bisphenol A-type semi-solid epoxy resin, nonvolatile cotent 85% (manufactured by Ohtake-Meishin Chemical Co., Ltd.) |
| (Note 3) | "NEOPOLYMER E-100": hydroxyl group-containing petroleum resin, softening point 100° C. (manufactured by Nippon Petrochemicals Co., Ltd.) |
| (Note 4) | "NOVARES CA 100": hydroxyl group-containing coumarone resin, softening point 100° C. (manufactured by Rutgers Chemicals AG) |
| (Note 5) | "HIRENOL PL-1000S" (product): liquid hydrocarbon resin, nonvolatile content 97% (manufactured by Kolon Chemical Co., Ltd.) |
| (Note 6) | "KBM 403" (product): silane coupling agent (manufactured by Shin-Etsu Chemical Co., Ltd.) |
| (Note 7) | "TALC F-2" (product): talc (manufactured by Fuji Talc Industrial Co., Ltd.) |
| (Note 8) | "SUZORITE MICA 200-HK" (product): mica (manufactured by Western Japan Trading Co., Ltd.) |
| (Note 9) | "POTASSIUM FELDSPAR KM325" (product): potassium feldspar(manufactured by Commercial Minerals Ltd.) |
| (Note 10) | "TITANIUM WHITE R-5N": titanium white (titanium dioxide, manufactured by Sakai Chemical Industry Co., Ltd.) |
| (Note 11) | "TAROX LL-XLO": yellow iron oxide (manufactued by Titan Kogyo, Ltd.) |
| (Note 12) | "ASA T-250F" (product): amide wax (manufactuerd by Itoh Oil Chemicals Co., Ltd.) |
| (Note 13) | "BENTONE SD-2" (product): organic bentonite(manufactured by Elementis Specialties, Inc.) |
| (Note 14) | "AEROSIL R972" (product): silicon dioxide (surface-treated product) (manufactured by Nippon Aerosil Co., Ltd.) |
| (Note 15) | Butyl acetate solution of n-butyl acrylate and iso-butyl acrylate copolymer, nonvolatile content 50% |

TABLE 1-continued

| | |
|---|---|
| (Note 16) | "SpectraSyn 40" (product): weight-average molecular weight 3200, viscosity 870 mPa · s/25° C., polymer obtained from 1-octene, 1-decene and 1-dodecene (manufactured by ExxonMobil Chemical Company) |
| (Note 17) | "SpectraSyn Elite 150": weight-average molecular weight 7600, viscosity 3780 mPa · s/25° C., polymer obtained from 1-octene, 1-decene and 1-dodecene (manufactured by ExxonMobil Chemical Company) |
| (Note 18) | "Nisseki Polybutene HV-100" weight-average molecular weight 2300 (manufactured by JX Nippon Oil & Energy Corporation) |
| (Note 19) | "MORESCO WHITE P-100" (product) (manufactured by MORESCO Corporation) |
| (Note 20) | "HIGH FLAT X-15P-2" (product) (manufactured by Gifu Shellac Manufacturing Co., Ltd.), melting point 100° C., average molecular weight 2000, nonvolitle content 15% |
| (Note 21) | "PA-290(A)" (product): polyamideamine, active hydrogen equivalent 277, nonvolatile content 59% (manufactured by Ohtake-Meishin Chemical Co., Ltd.) |
| (Note 22) | "MAD-204(A)" (product): modified polyamine, active hydrogen equivalent 202, nonvolatile content 65% (manufactured by Ohtake-Meishin Chemical Co., Ltd.) |
| (Note 23) | "ANCAMINE K-54" (product): tertiary amine (manufactured by Air Products Japan, Inc.) |

A liquid acrylic resin of (Note 15) was prepared as follows.

Under a nitrogen gas flow, 200 g of butyl acetate was placed in a 500 ml four-neck flask and heated to 125° C. with stirring. Then, 100 g of n-butyl acrylate, 100 g of iso-butyl acrylate, and 1.6 g of a polymerization initiator: t-butylperoxy-2-ethylhexanoate (product name: KAYA ESTER O manufactured by Kayaku Akzo Co., Ltd.) were placed in a dropping funnel, and were dropwise added into the heated flask over a period of 3 hours. During the dropping, temperature inside the flask was controlled to be a temperature of from 120 to 130° C.

After that, as a post reaction, the resultant was stirred at 125° C. for 4 hours, and then cooled down to 60° C. or less to prepare a butyl acetate solution of an acrylic copolymer. The solution obtained had a heating residue of 50%. Part of the solution obtained was taken out and its solvent was evaporated to obtain the acrylic copolymer. A weight-average molecular weight (Mw) of the acrylic copolymer measured by GPC was about 15,000, and a glass transition temperature thereof measured by DSC was about −36° C.

Example 1

As shown in Table 2 below, 19 parts by weight of an epoxy resin (Note 1), 10 parts by weight of a petroleum resin (Note 3), 4 parts by weight of a liquid petroleum resin (Note 5), 9.5 parts by weight of xylene, 2 parts by weight of butanol, 1 part by weight of 1-methoxy-2-propanol, 1 part by weight of a silane coupling agent (Note 6), 23 parts by weight of talc (Note 7), 6 parts by weight of mica (Note 8), 15 parts by weight of potassium feldspar (Note 9), 6 parts by weight of titanium white (Note 10), 1.5 parts by weight of yellow iron oxide (Note 11), 1.5 parts by weight of an anti-sagging agent (Note 12), and 0.5 parts by weight of a poly-a-olefin containing a branched structure (Note 16) were placed in a container. Then, glass beads were added thereto and these components were mixed together using a paint shaker. Next, the glass beads were removed and the mixture was dispersed at a temperature ranging from 56 to 60° C. using a high speed disper, followed by cooling down to 30° C. or less to prepare a main agent component.

As shown in Table 2 below, 9.4 parts by weight of a polyamideamine (Note 21), 4.7 parts by weight of a modified polyamine (Note 22), 0.1 parts by weight of a tertiary amine (Note 23), and 0.8 parts by weight of 1-methoxy-2-propanol were mixed together by using a high speed disper to prepare a curing agent component.

100 parts by weight of the main agent component obtained and 15 parts by weight of the curing agent component obtained were mixed together before coating procedure to prepare a composition.

Examples 2 to 8 and Comparative Examples 1 to 7

Compositions were prepared in the same manner as Example 1 except that components and amounts thereof to be used in the main agent component and the curing agent component were changed as those shown in Table 2 below.

TABLE 2

| | | | Example 1 | Example 2 | Example 3 | Example 4 | Example 5 | Example 6 | Example 7 | Example 8 |
|---|---|---|---|---|---|---|---|---|---|---|
| Main agent component | (a) | Epoxy resin (Note 1) | 19 | 19 | 19 | 19 | 15.5 | 0 | 19 | 19 |
| | (a) | Epoxy resin(Note 2) | 0 | 0 | 0 | 0 | 3 | 20.5 | 0 | 0 |
| | | Petroleum resin (Note 3) | 10 | 0 | 0 | 0 | 10 | 4 | 10 | 10 |
| | | Cournarone-indene resin (Note 4) | 0 | 0 | 10 | 10 | 0 | 0 | 0 | 0 |
| | | Liquid petroleum resin (Note 5) | 4 | 14 | 4 | 4 | 4 | 10 | 4 | 4 |
| | | Xylene | 9.5 | 9.1 | 9.6 | 9.5 | 9.8 | 8.3 | 9.5 | 9.5 |
| | | Butanol | 2 | 2 | 2 | 2 | 2 | 2 | 2 | 2 |
| | | 1-methoxy-2-propanol | 1 | 1 | 1 | 1 | 1 | 1 | 1 | 1 |
| | (d) | Silane coupling agent (Note 6) | 1 | 1 | 1 | 1 | 1 | 1 | 1 | 1 |
| | (g) | Talc (Note 7) | 23 | 23 | 23 | 23 | 23 | 23 | 23 | 23 |
| | (h) | Mica (Note 8) | 6 | 6 | 6 | 6 | 6 | 6 | 6 | 6 |
| | (g) | Potassium feldspar (Note 9) | 15 | 15 | 15 | 15 | 15 | 15 | 15 | 15 |
| | | Titanium white (Note 10) | 6 | 6 | 6 | 6 | 6 | 6 | 6 | 6 |
| | | Yellow iron oxide (Note 11) | 1.5 | 1.5 | 1.5 | 1.5 | 1.5 | 1.5 | 1.5 | 1.5 |
| | (e) | Anti-sagging agent (Note 12) | 1.5 | 1 | 1 | 1.5 | 1.5 | 1.5 | 1.5 | 1.5 |
| | | Organic bentonite (Note 13) | 0 | 0.3 | 0.3 | 0 | 0 | 0 | 0 | 0 |
| | | Fumed silica (Note 14) | 0 | 0.2 | 0.2 | 0 | 0 | 0 | 0 | 0 |
| | (f) | Liquid acrylic resin (Note 15) | 0 | 0 | 0.2 | 0.3 | 0.5 | 0.1 | 0 | 0 |
| | (c) | Poly-α-olefin (Note 16) | 0.5 | 0.9 | 0 | 0.2 | 0 | 0.1 | 0.1 | 0.2 |
| | (c) | Poly-α-olefin (Note 17) | 0 | 0 | 0.2 | 0 | 0.2 | 0 | 0 | 0 |
| | | Polybutene (No. 18) | 0 | 0 | 0 | 0 | 0 | 0 | 0 | 0 |
| | | Liquid paraffin (No. 19) | 0 | 0 | 0 | 0 | 0 | 0 | 0 | 0 |

TABLE 2-continued

|  |  |  |  |  |  |  |  |  |  |
|---|---|---|---|---|---|---|---|---|---|
|  |  | Acrylic/vinyl ether-based deforming agent | 0 | 0 | 0 | 0 | 0 | 0 | 0 | 0 |
|  |  | Polyethylene (No. 20) | 0 | 0 | 0 | 0 | 0 | 0 | 0 | 0 |
|  |  | Subtotal (parts by weight) | 100 | 100 | 100 | 100 | 100 | 100 | 99.6 | 99.7 |
| Curing agent component | (b) | Polyamideamine (Note 21) | 9.4 | 9.4 | 9.4 | 9.4 | 9.4 | 8 | 9.4 | 9.4 |
|  | (b) | Modified polyamine (Note 22) | 4.7 | 4.7 | 4.7 | 4.7 | 4.7 | 4 | 4.7 | 4.7 |
|  |  | Tertiary amine (Note 23) | 0.1 | 0.1 | 0.1 | 0.1 | 0.1 | 0.2 | 0.1 | 0.1 |
|  |  | 1-methoxy-2-propanol | 0.8 | 0.8 | 0.8 | 0.8 | 0.8 | 0.3 | 0.8 | 0.8 |
|  |  | Subtotal (parts by weight) | 15 | 15 | 15 | 15 | 15 | 12.5 | 15 | 15 |
|  |  | Total (parts by weight) | 115 | 115 | 115 | 115 | 115 | 112.5 | 114.6 | 114.7 |
|  |  | Color of coating film | Cream | Cream | Cream | Cream | Cream | Cream | Cream | Cream |
|  |  | Appearance of coating film (deforming properties) | A | A | A | A | A | A | A | A |
|  |  | Salt water resistance | A | A | A | A | A | A | A | A |
|  |  | Electric anticorrosion test | A | A | A | A | A | A | A | A |
|  |  | Neutral salt spray test | A | A | A | A | A | A | A | A |
|  |  | High humidity resistance at a high temperature | A | A | A | A | A | A | A | A |
|  |  | Adhesion onto spray dust | B | B | A | A | A | A | B | B |

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Main agent component | (a) | Epoxy resin (Note 1) | 19 | 19 | 19 | 0 | 19 | 19 | 19 |
|  | (a) | Epoxy resin (Note 2) | 0 | 0 | 0 | 22 | 0 | 0 | 0 |
|  |  | Petroleum resin (Note 3) | 10 | 10 | 10 | 4 | 10 | 10 | 0 |
|  |  | Coumarone-indene resin (Note 4) | 0 | 0 | 0 | 0 | 0 | 0 | 10 |
|  |  | Liquid petroleum resin (Note 5) | 4 | 4 | 4 | 10 | 4 | 4 | 4 |
|  |  | Xylene | 9.5 | 9.7 | 9.7 | 8.8 | 9.3 | 8.9 | 10.8 |
|  |  | Butanol | 2 | 2 | 2 | 2 | 2 | 2 | 2 |
|  |  | 1-methoxy-2-propanol | 1 | 1 | 1 | 1 | 1 | 1 | 1 |
|  | (d) | Silane coupling agent (Note 6) | 1 | 1 | 1 | 1 | 1 | 1 | 0 |
|  | (g) | Talc (Note 7) | 23 | 23 | 23 | 22 | 23 | 23 | 23 |
|  | (h) | Mica (Note 8) | 6 | 6 | 6 | 6 | 6 | 6 | 6 |
|  | (g) | Potassium feldspar (Note 9) | 15 | 15 | 15 | 14 | 15 | 15 | 15 |
|  |  | Titanium white (Note 10) | 6 | 6 | 6 | 6 | 6 | 6 | 6 |
|  |  | Yellow iron oxide (Note 11) | 1.5 | 1.5 | 1.5 | 1.5 | 1.5 | 1.5 | 1.5 |
|  | (e) | Anti-sagging agent (Note 12) | 1.5 | 1 | 1 | 1.5 | 1.5 | 1 | 1.5 |
|  |  | Organic bentonite (Note 13) | 0 | 0.3 | 0.3 | 0 | 0 | 0.3 | 0 |
|  |  | Fumed silica (Note 14) | 0 | 0.3 | 0.3 | 0 | 0 | 0.3 | 0 |
|  | (f) | Liquid acrylic resin (Note 15) | 0 | 0 | 0 | 0 | 0.5 | 0 | 0.2 |
|  | (c) | Poly-α-olefin (Note 16) | 0 | 0 | 0 | 0 | 0 | 0 | 0 |
|  | (c) | Poly-α-olefin (Note 17) | 0 | 0 | 0 | 0 | 0 | 0 | 0 |
|  |  | Polybutene (No. 18) | 0 | 0.2 | 0 | 0.2 | 0 | 0 | 0 |
|  |  | Liquid paraffin (No. 19) | 0 | 0 | 0.2 | 0 | 0 | 0 | 0 |
|  |  | Acrylic/vinyl ether-based deforming agent | 0 | 0 | 0 | 0 | 0.2 | 0 | 0 |
|  |  | Polyethylene (No. 20) | 0 | 0 | 0 | 0 | 0 | 1 | 0 |
|  |  | Subtotal (parts by weight) | 99.5 | 100 | 100 | 100 | 100 | 100 | 100 |
| Curing agent component | (b) | Polyamideamine (Note 21) | 9.4 | 9.4 | 9.4 | 8 | 9.4 | 9.4 | 9.4 |
|  | (b) | Modified polyamine (Note 22) | 4.7 | 4.7 | 4.7 | 4 | 4.7 | 4.7 | 4.7 |
|  |  | Tertiary amine (Note 23) | 0.1 | 0.1 | 0.1 | 0.2 | 0.1 | 0.1 | 0.1 |
|  |  | 1-methoxy-2-propanol | 0.8 | 0.8 | 0.8 | 0.3 | 0.8 | 0.8 | 0.8 |
|  |  | Subtotal (parts by weight) | 15 | 15 | 15 | 12.5 | 15 | 15 | 15 |
|  |  | Total (parts by weight) | 115 | 115 | 115 | 112.5 | 115 | 115 | 115 |
|  |  | Color of coating film | Cream | Cream | Cream | Cream | Cream | Cream | Cream |
|  |  | Appearance of coating film (deforming properties) | D | D | D | D | C | D | D |
|  |  | Salt water resistance | A | A | A | A | A | A | A |
|  |  | Electric anticorrosion test | A | A | A | A | A | A | A |
|  |  | Neutral salt spray test | A | A | A | A | A | A | B |
|  |  | High humidity resistance at a high temperature | A | A | A | A | A | A | A |
|  |  | Adhesion onto spray dust | C | C | C | C | A | C | A |

REFERENCE SIGNS LIST

1: anticorrosive coating film
2: X-shaped incision
3: incision-formed area

The invention claimed is:

1. An anticorrosive coating composition comprising
an epoxy resin (a),
a curing agent (b),
a poly-α-olefin (c) that comprises a structural unit derived from an α-olefin having 6 or more carbon atoms and not containing, in its molecule, any aromatic structures or any polar groups, and
a solvent,
wherein the amount of the poly-α-olefin (c) is from 0.01 to 5 parts by weight (nonvolatile content) with respect to 100 parts by weight of a nonvolatile content in the anticorrosive coating composition.

2. The anticorrosive coating composition according to claim 1, further comprising a silane coupling agent (d).

3. The anticorrosive coating composition according to claim 1, further comprising an amide wax (e) and a liquid acrylic polymer (f).

4. The anticorrosive coating composition according to claim 3, wherein the liquid acrylic polymer (f) comprises a structural unit derived from an acrylate having an alkyl group of 4 to 18 carbon atoms containing a branched structure.

5. The anticorrosive coating composition according to claim 3, wherein the liquid acrylic polymer (f) comprises a structural unit derived from isobutyl acrylate or 2-ethylhexyl acrylate.

6. The anticorrosive coating composition according to claim 3, wherein the composition comprises the liquid acrylic polymer (f) in an amount of from 0.01 to 5 parts by weight (nonvolatile content) with respect to 100 parts by weight of a nonvolatile content in the anticorrosive coating composition.

7. The anticorrosive coating composition according to claim 3, wherein the liquid acrylic polymer (f) has a glass transition temperature of 0° C. or less.

8. The anticorrosive coating composition according to claim 1, further comprising an extender pigment (g).

9. The anticorrosive coating composition according to claim 8, wherein the extender pigment (g) includes at least a flaky pigment (h).

10. A method for preventing corrosion of a substrate, comprising applying on a substrate the anticorrosive coating composition according to claim 1.

11. The anticorrosive coating composition according to claim 1, wherein the α-olefin has from 6 to 20 carbon atoms.

12. The anticorrosive coating composition according to claim 1, wherein the α-olefin is selected from 1-hexene, 1-octene, 1-decease, 1-dodecene 1-tetradecene, 1-hexadecene, 1-octadecene, and mixtures thereof.

13. The anticorrosive coating composition according to claim 1, wherein the poly-α-olefin (c) is selected from a homopolymer obtained from 1-decene and copolymers obtained from at least two monomers selected from 1-decene, 1-octene, and 1-dodecene.

14. The anticorrosive coating composition according to claim 1, wherein the solvent is selected from xylene, toluene, methyl isobutyl ketone, methyl ethyl ketone, butyl acetate, butanol, isopropyl alcohol, 1-methoxy-2-propanol, and mixtures thereof.

* * * * *